United States Patent [19]
Boden et al.

[11] Patent Number: 5,804,525
[45] Date of Patent: Sep. 8, 1998

[54] METHOD FOR MAKING POLYCARBONATES

[75] Inventors: Eugene P. Boden, Scotia, N.Y.; Larry I. Flowers, Evansville; Roy R. Odle, Mt. Vernon, both of Ind.; Peter D. Phelps, Schenectady, N.Y.; David L. Ramsey, Mt. Vernon; Paul D. Sybert, Evansville, both of Ind.

[73] Assignee: General Electric Company, Pittsfield, Mass.

[ * ] Notice: The term of this patent shall not extend beyond the expiration date of Pat. No. 5,744,416.

[21] Appl. No.: 597,417

[22] Filed: Feb. 8, 1996

Related U.S. Application Data

[62] Division of Ser. No. 241,324, May 10, 1994, Pat. No. 5,519,105.

[51] Int. Cl.⁶ .................................................. B01J 31/00
[52] U.S. Cl. .......................... 502/162; 502/164; 502/167; 502/200
[58] Field of Search .................................. 502/162, 164, 502/167, 200

[56] References Cited

U.S. PATENT DOCUMENTS

| | | |
|---|---|---|
| 3,635,895 | 1/1972 | Kramer . |
| 4,001,184 | 1/1977 | Scott . |
| 4,156,069 | 5/1979 | Prevorsek et al. . |
| 4,465,820 | 8/1984 | Miller et al. . |
| 4,471,105 | 9/1984 | Campbell et al. . |
| 4,506,065 | 3/1985 | Miller et al. . |
| 4,701,544 | 10/1987 | Silva . |
| 4,722,994 | 2/1988 | Boden ...................................... 528/196 |
| 4,814,420 | 3/1989 | Brunelle et al. . |
| 5,274,068 | 12/1993 | Boden et al. ........................... 528/179 |
| 5,300,623 | 4/1994 | Boden et al. ........................... 528/199 |
| 5,300,624 | 4/1994 | Boden et al. ........................... 528/199 |
| 5,391,692 | 2/1995 | Boden et al. . |
| 5,519,105 | 5/1996 | Boden et al. ........................... 528/199 |

OTHER PUBLICATIONS

Tagle et al., *Europ. Polym. J.*, 1987, 23 (2), pp. 109–112.

Tagle et al., *Europ. Polym. J.*, 1989, 26 (6), pp. 549–551.

Agree et al., *Talanta*, 1966, 13, pp. 1151–1160.

*Primary Examiner*—Elizabeth D. Wood

[57] ABSTRACT

A composition and method is provided for making polycarbonate utilizing an effective amount of a binary catalyst system, comprising a phase transfer catalyst and a tertiary organic amine, as a condensation catalyst during the interfacial phosgenation of a bisphenol, such as bisphenol A. for improved phosgene utiliziation.

7 Claims, No Drawings

METHOD FOR MAKING POLYCARBONATES

This application is a divisional of application Ser. No. 08/241,324, filed May 10, 1994, now U.S. Pat. No. 5,519,105.

BACKGROUND OF THE INVENTION

The present invention relates to a method for making polycarbonate by phosgenating a bisphenol in the presence of a phase transfer catalyst (PTC). More particularly, the present invention relates to the employment of a PTC, such as a tetraalkylammonium or tetraalkyl phosphonium halide, as it condensation catalyst for the polymerization of a bisphenol under interfacial reaction conditions in combination with a tertiary organic amine.

As shown by Freitag et al, The Encyclopedia of Polymer Science and Engineering, John Wiley & sons, New York (1988), Second Edition, polycarbonates have been made by phosgenating bisphenols under interfacial reaction conditions using a tertiary organic amine, such as triethylamine, as a condensation catalyst. Although tertiary organic amines have been found to be effective as bisphenol condensation catalysts, experience has shown that use of tertiary organic amines results in excess phosgene usage. Efforts have been made therefore to develop procedures to minimize excessive phosgene losses. For example, a reactor with an overhead condenser can be used to trap phosgene, as shown by Silva, U.S. Pat. No. 4,701,544, or the rate of heat generated during the course of bisphenol condensation can be monitored, as shown by Brunelle et al, U.S. Pat. No. 4,814,420.

Although tertiary organic amines have been found to be highly effective as condensation catalysts for building polycarbonate molecular weight during phosgenation, experience has shown that tertiary organic amines often lead to excessive phosgene usage as a result of phosgene hydrolysis, and/or chloroformate hydrolysis prior to the termination of polymerization. For example, in a phosgene hydrolysis rate study, it was found that at a triethylamine concentration of $6.64 \times 10^{-3}$M, triethylamine catalyst effected phosgene hydrolysis at a relative rate of greater than 200 compared to a reference value of 1 without any catalyst. With respect to the rate of chloroformate hydrolysis, where a relative value of less that 0.01 has been found for a catalyst-free system, triethylamine shows a value of greater than 100.

In Campbell et al, U.S. Pat. No. 4,471,105, an interfacial polycarbonate poly condensation process is shown for making polycarbonates from sterically hindered bisphenol precursors utilizing a quaternary phosphonium amino halide catalyst. Additional investigations with respect to phase transfer catalyst usage demonstrate the syntheses of copolycarbonates (carbonate-thiocarbonate)s from bisphenols and a mixture of phosgene and thiophosgene are shown by Tagle et al, European Polymer Journal 1987, 23(2), 109–112, and European Polymer Journal 1989,26(6), 549–551.

Various condensation catalysts are constantly being evaluated to determine their effectiveness for polymerizing various types of polymers. Considerable effort is being maintained to determine the effectiveness of such condensation catalysts as replacement condensation catalysts for tertiary organic amines in conventional polycarbonate synthesis.

SUMMARY OF THE INVENTION

The present invention is based on the discovery that a phase transfer catalyst, "PTC", selected from the class consisting of,

$(R)_4N^+X$, (FORMULA 1)

$R^1(R)_3Q^+X$, and (FORMULA 2)

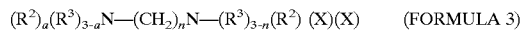

$(R^2)_a(R^3)_{3-a}N\text{—}(CH_2)_nN\text{—}(R^3)_{3-n}(R^2)(X)(X)$ (FORMULA 3)

where R is selected from the same or different $C_{(3-10)}$ alkyl group, $R^1$ is a $C_{(1-3)}$ alkyl group, $R^2$ is selected from the same or different $C_{(1-2)}$ alkyl group, $R^3$ is selected from the same or different C(3–10) alkyl group, Q is a nitrogen or phosphorus atom, X can be a halogen atom, or an —$OR^4$ group, $R^4$ is a member selected from H, $C_{(1-18)}$ alkyl or $C_{(6-18)}$ aryl, "n" is a whole number from 4 to 6 and "a" is a whole number equal to 0 to 1, and additionally comprising a small amount of a tertiary organic amine such as triethylamine ranging from about 0.1 to about 2.0 mole % based on the quantity of bis-phenol-A has been found to be effective as a bisphenol condensation catalyst under interfacial reaction conditions between bisphenols, or oligomeric phenols, and chloroformate terminated bisphenols, or chloroformate terminated polycarbonate oligomers. As a result, the PTC's of the present invention can be used to make aromatic polycarbonates and polycarbonate copolymers, such as shown in U.S. Pat. Nos. 3,635,895 and 4,001,184, herein incorporated by reference. These aromatic polycarbonates which can be made using the phase transfer catalyst of the present invention include high molecular weight thermoplastic randomly branched materials. Some of the polyfunctional compounds which can be employed in making the branched polymers are generally aromatic and contain at least three functional groups, such as phenoxy, carboxyl, carboxylic anhydride, haloformyl or mixtures there of. Additional polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid and benzophenonetetracarboxylic anhydride. Polyfunctional aromatic compounds useful in making high molecular weight thermoplastic randomly branched polycarbonates are 1,1,1-tris-(4-hydroxyphenyl)-ethane, 4-[4-[1,1-bis(4-hydroxyphenyl)-ethyl]-dimethylbennzyl] phenol, 1,1,1-tris (4-hydroxphenyl)ethane, trimellitic anhydride or trimellitic acid or their haloformyl derivatives.

An example for copolymer formation is the preparation of copolyester carbonates from dicarboxylic acids. These copolymer compositions are set forth in U.S. Pat. Nos. 4,506,065, 4,465,820, and 4,156,069, herewith incorporated by reference. Although any aromatic dicarboxylic acid can be used, the preferred dicarboxylic acids are terephthalic acids anci isophthalic acids and mixtures thereof. Alternatively, derivatives of such acids, such as the acid halides, for example the acid dichlorides and acid dibromides for such aromatic dicarboxylic acids, for example, terephthaloyl dichloride, mixtures with isophthaloyl dichloride can also be used. High flow ductile copolyester carbonates using aliphatic dicarboxylic acids also can be prepared. The preferred aliphatic dicarboxylic acids are azelaic acid, suberic acid, 1,10-decanedicarboxylic acid and 1,12-dodecanedicarboxylic acid. In addition, polycarbonate-siloxane block copolymers also can be made by utilizing the phase transfer catalyst of the present invention in the reaction between a bisphenol and a phenolic terminated polydiorgano siloxane, such as a eugenol terminated polydimethylsiloxane.

In addition, it has been found that the relative rate of phosgene hydrolysis, or chloroformate hydrolysis for the PTC of formulas (1), (2) or (3) at a molar concentration of 6.64–10⁻³, is considerably less than triethylamine. For example, as compared to values greater than 200 and 100 respectively for triethylamine as a phosgene or chloroformate hydrolysis catalyst at molar concentrations of 6.64× 10⁻³, a phase transfer catalyst within formula (1) or (2) have been found to have relative rate values of 1.7 to 3.5 for phosgene and about 1 for chloroformate. Although tertiary organic amines have been demonstrated to hydrolyze phosgene and chloroformates, the combination of tertiary organic amines and a phase transfer catalyst has given unexpected and surprising results as herein described. By keeping the concentration of the triethylamine catalyst component in a range varying from about 0.1 to about 2.00 mole % based on bis-phenol-A the utilization of phosgene can be made much more efficient, reducing the amount of excess phosgene necessary to insure complete reaction of the bisphenol from about a 15% excess, based on using the tertiary amine alone, to about a 5% excess, sometimes even lower.

DETAILED DESCRIPTION OF THE INVENTION

There is provided by the present invention, a method for making polycarbonate, comprising, (a) effecting reaction under interfacial reaction conditions at a pH in the range of 7 to 12.5 between a phenolic chain-stopper and a bisphenol of the formula,

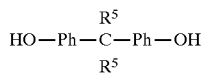

where $R^5$ is selec$^{ted}$ from the same or different $C_{(1-4)}$ alkyl group, and a substantially stoichiometric amount of phosgene in the presence of an amount of phase transfer catalyst comprising the formulas (1), (2) or (3) and tertiary amine having the formula:

where each of the $R^6$ are independently selected from the group of $C_2$ to $C_{10}$ alkyl radicals and which is effective for providing polycarbonate having a GPC weight average molecular weight in the range of about 10K to about 180k compared, and (B) substantially eliminating chloroformate end groups in the resulting mixture of (A) prior to polycarbonate recovery.

Some of the bisplienols which are included within the formula (4) are, for example, 2,2-bis(4-hydroxy phenyl)propane (bisphenol A)
2,2-bis(4-hydroxy phenyl)butane (bisphenol B)
4,4-bis(hydroxy phenyl)heptane
2,2-bis(hydroxy phenyl)hexane
2,2-bis(4-hydroxy phenyl)pentane
2,2-bis(4-hydroxy phenyl)4-methyl pentane
2,2-bis(4-hydroxy phenyl)heptane, and
3,3-bis(4-hydroxy phenyl)2,4-dimethyl pentane.

Some of the phase transfer catalysts which are included within formula (1) are for example, $[CH_3(CH_2)_3]_4NX$
$[CH_3(CH_2)_5]_4NX$
$[CH_3(CH_2)_6]_4NX$, and
$CH_3[CH_3(CH_2)_3]_3NX$ where X is selected from Cl—, Br— or —OR⁴, or where $R^4$ is as previously defined.

In addition to the phase transfer catalysts of formula (1), there are included within formulas (2) and (3), phase transfer catalysts having the formulas, $CH_3(C_4H_9)_3NX$,
$CH_3(C_4H_9)_3PX'$
$C_2H_5(C_6H_{13})_3NX$,
$(C_4H_9)_3N—(CH_2)_6—N(C_4H_9)_3(X)(X)$,
$(C_3H_7)_3N—(CH_2)_6—N(C_4H_9)_3(X)(X)$, and
$CH_3(C_5H_{11})_2N—(CH_2)_4—N(C_5H_{11})_2CH_3(X)(X)$ where X is as previously defined.

In the practice of one form of the present invention, a mixture of bisphenol and a phenolic chain-stopper is phosgenated under interfacial reaction conditions in the presence of an organic solvent, in the presence of an effective amount of a phase transfer catalyst included within formula (1), (2) or (3) and also containing triethylamine. Generally the quantity of phase transfer catalyst or first catalyst used ranges from about 0.05 mole % to about 10.00 mole % phase transfer catalyst based on the total moles of bisphenol and phenolic chain stopper present in the reaction medium; such quantity constituting an effective amount. A preferred range for the first catalyst ranges of from about 0.1 to 0.7 mole % based on the total moles of bisphenol and phenolic chain stopper. She quantity of tertiary amine co-catalyst or second catalyst ranges from about 0.01 to 6.00 mole % based on the moles of bis-phenol-A present in the reaction medium, a more preferred range is 0.01 to 2.00 mole %, and the most preferred range is 0.20 to 0.70 mole %. Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Sufficient alkali metal hydroxide can be utilized to raise the pH of the bisphenol reaction mixture to 10.5 prior to phosgenation to provide dissolution of some of the bisphenol and chain-stopper into the aqueous phase.

Aqueous alkali, or alkaline earth metal hydroxide can be used to maintain the pH of the phosgenation mixture which can be in the range of between about 7 to about 12.5 and preferable 10 to 12. Some of the alkali metal or alkaline earth metal hydroxides, which can be employed are for example, sodium hydroxide, potassium hydroxide, and calcium hydroxide. Sodium and potassium hydroxides and particularly sodium hydroxide is preferred.

Phosgenation of the bisphenol can be conducted in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of 0.2–1.1. Reaction temperature can be in the range of between about 15°–50° C. When the preferred organic liquid is utilized, such as methylene chloride, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mol of phosgene, per mol of bisphenol per minute.

Depending upon the molecular weight of polycarbonate desired, phenolic chain-stoppers (:an be used in a proportion of from 1 to 8 mole % based on the total moles of bisphenol and phenolic chain-stopper. Some of the phenolic chain-stoppers are, phenol, t-butyl phenol, p-cumyl phenol and the chloroformates of these phenols.

Prior to polycarbonate recovery which can be achieved by standard techniques, such as filtration, decantation, and centrifugation, chloroformate end groups are normally substantially eliminated. When a phase transfer catalyst s used by itself, the reaction mixture must be agitated for a long period of time until the presence of chloroformates can no longer be detected. Alternatively, the addition of an equivalent level of a phenolic compound, based on the level of chloroformate, can be added at the end of the reaction.

In the present invention a binary catalyst system comprising a phase transfer catalyst and a tertiary organic amine, the chloroformates react after a few minutes leading to a kinetically improved process. The reaction mixture containing chloroformates is agitated until the presence of chloroformates can not be detected. A detection procedure based on Agree et al can be used employing 4-(4-nitrobenzyl) pyridine (NBP) as shown in Talanta, 1966,13,1151–1160. Spot testing using commercially available phosgene detection paper, such as Chemcasette SP from MDA Scientific of Lincolnshire, Ill., with a portion of the reaction mixture also can be employed.

In order that tho,se skilled in the art will be better able to practice the present invention, The following examples are given by way of illustration and not by way of limitation. All parts are by weight unless otherwise indicated.

EXAMPLES

Example 1

A 30 liter flask equipped with a stirrer, condenser, pH electrode, NaOH addition port and a phosgene dip tube was charged with 2,268 g of bisphenol-A, 67.55 g of para-cumyl-phenol, 3.4 g sodium gluconate, 16 g of tetrabutylammonium bromide, 3.3 liters water, and 8.1 liters of methylene chloride. Phosgene was introduced at a rate of approximately 40 g/min. A solution of 50 wt % NaOH was added slowly to maintain a pH of about 10.5 during the phosgene addition. Phosgene addition was terminated when chloroformates were detected by chloroformate test paper (Chemcassette SP from MDA Scientific; Lincoln, Ill.). The reaction was stirred at pH 10.5 and the reaction solution was periodically tested for the presence of chloroformates. After a period of 30 minutes, chloroformates were still detected and 14 ml of triethylamine was added. Upon addition of the triethylamine the chloroformates could no longer be detected by the chloroformate test paper. A sample was removed for molecular weight measurement To confirm the completion of polymerization, approximately 5% excess additional phosgene was added to the remaining solution while controlling the pH at about 10.5 with the addition of NaOH. After testing with chloroformate test paper to confirm the absence of chloroformates, the reaction mixture was again sampled for the purposes of a molecular weight measurement of the product polymer. Weight average molecular weights of about 32,000 for each sample indicated that the polymerization was completed during the first phosgenation and consequently the amount of phosgene used can be measured from when chloroformates were first observed. An excess of phosgene of 1.2% over theoretical was required.

Concentrated aqueous HCl was added until the pH was lowered to about 1.0. The aqueous phase was removed and the organic phase was washed several times with water. Comparative results are summarized in a following table.

Example 2

The experiment of example 1 was repeated using methyltributylammonium chloride as the phase transfer catalyst in place of tetrabutylammonium bromide. As in example 1, phosgenation was terminated when chloroformates were first detected and the chloroformates were present for 30 minutes when triethylamine was then added to complete the reaction. Molecular weight measurement after the chloroformates disappeared and after a 5% rephosgenation showed the same molecular weight indicating completion of the polymerization with 2% excess phosgene required. Comparative results are summarized in a following table.

Example 3

The experimental apparatus used in example 1 was charged with 2,268 g bisphenol-A, 67.55 g para-cumyl-phenol, 3.4 g sodium gluconate, 3.3 liters of water, 8.1 liters of methylene chloride, and 14 ml of triethylamine. Phosgene was introduced at a rate of approximately 40 g/min. A solution of 50 wt % NaOH was added slowly to maintain a pH of 10.5 during phosgene addition. Samples for molecular weight determinations were taken between 90% phosgene utilization and about 15 % excess phosgene utilization. Molecular weight reached a maximum at approximately 13% excess phosgene and did not change with further addition of phosgene. No chloroformates were detected during the reaction. The experiment was twice repeated and both times showed a molecular weight maximum at 7% excess phosgene. Comparative results are summarized in a following table.

Example 4

The experimental apparatus used in example 1 was charged with 2,268 g bisphenol-A, 67.55 g para-cumyl-phenol, 3.4 g sodium gluconate, 3.3 liters of water, and 8.1 liters of methylene chloride. To this mixture was added 12.5 g methyltributylammonium chloride and 3.5 ml of triethylamine. Phosgene was introduced at a rate of approximately 40 g/min. A solution of 50 wt % NaOH was added slowly to maintain a pH of about 10.5 during the phosgene addition.

As in example 1, phosgene addition was terminated when chloroformates were detected by chloroformate test paper. The chloroformates were no longer detectable after a period of about 5 minutes. To confirm the completion of polymerization, approximately 5% additional phosgene was added to the remaining solution while the pH was maintained at 10.5 by means of the further addition of NaOH. After confirming the absence of chloroformates, the reaction mixture was sampled for a molecular weight measurement. Weight average molecular weights of about 32,000 for each sample indicated that the polymerization was completed during the first phosgenation. Comparative results are summarized in a following table.

Example 5

The experiment of example 4 was repeated substituting 14.59 g of hexabutylbutylenediammonium bromide for methyltributylammmonium chloride. 3.5 ml of triethylamine was used as a co-catalyst. Comparative results are summarized in a following table.

Example 6

The experiment of example 4 was repeated substituting 16.81 g of hexabutylhexylenediammonium bromide for methyltributylammmonium chloride. 3.5 ml of triethylamine was used as a co-catalyst. Comparative results are summarized in a following table.

TABLE I

Summary of Experimental Results

| Example | Phase Transfer Catalyst (PTC) | Amount of PTC (g) | Amount of Triethyl-amine (ml) | Excess Phosgene Required, % |
|---|---|---|---|---|
| 1 | TBAB | 16.00 | 0 | 1.2 |
| 2 | MTBA | 12.50 | 0 | 2.0 |
| 3a | none | 0 | 14 | 13.0 |
| 3b | none | 0 | 14 | 7.0 |
| 3c | none | 0 | 14 | 7.0 |
| 4 | MTBA | 12.50 | 3.5 | 2.0 |
| 5 | C4B | 14.59 | 3.5 | 3.3 |
| 6 | C6B | 16.81 | 3.5 | 4.8 |

Notes:
TBAB = tetrabutylammonium bromide
MTBA = methyltributylammonium chloride
C4B = hexabutylbutylenediammonium bromide
C6B = hexabutylhexylenediammonium bromide

SUMMARY OF EXPERIMENTAL RESULTS

Example 1 and 2 demonstrate that a phosgene utilization close to theoretical can be achieved using a phase transfer catalyst. This catalyst system has the disadvantage of suffering from persistent chloroformates at completion of the reaction. The presence of chloroformates requires the addition of triethylamine, bisphenol-A, or some other phenolic compound for timely elimination of chloroformates from the reaction mixture. Example 3 demonstrates poor phosgene utilization when using triethylamine as the sole catalyst. Examples 4, 5, and 6 show the advantage of using the binary catalyst of the invention, a phase transfer catalyst and triethylamine, to achieve improved phosgene utilization with timely chloroformate decomposition.

What is claimed is:

1. A catalyst composition to catalyze the interfacial condensation reaction to produce polycarbonates, polyesters, copolymers, or mixtures thereof, said catalyst composition comprising a mixture of two or more catalysts wherein a first catalyst is selected from the group consisting of:

$(R)_4N^+X$, $R^1(R)_3Q^+X$, and $(R^2)_a(R^3)_{3-a}N-(CH_2)_nN-(R^3)_{3-a}(R^2)_a(X)(X)$ where R is selected from the same or different $C_{(4-10)}$ alkyl group, $R^1$ is a $C_{(1-3)}$alkyl group, $R^2$ is selected from the same or different $C_{(1-2)}$alkyl group, $R^3$ is selected from the same or different $C_{(3-10)}$ alkyl group, Q is a nitrogen or phosphorus atom, X is a halogen atom, or an $-OR^4$ group, $R^4$ is a member selected from H, $C_{(1-18)}$ alkyl or $C_{(6-18)}$ aryl, "n" is a whole number from 4 to 6 and "ak" is a whole number equal to 0 or 1; and a second catalyst is a tertiary organic amine and wherein the weight ratio of said first catalyst to said second catalyst is from 4.9 to 1 to 6.6 to 1.

2. The catalyst composition of claim 1 wherein said first catalyst is $(R)_4N^+X$.

3. The catalyst composition of claim 1 wherein said first catalyst is $R^1(R)_3Q^+X$.

4. The catalyst composition of claim 1 wherein said first catalyst is $(R^2)_a(R^3)_{3-a}N-(CH_2)_nN-(R^3)_{3-a}(R^2)_a(X)(X)$.

5. The catalyst composition of claim 1 wherein the tertiary organic amine is selected from the group consisting of triethylamine, ethylpiperidine, tripropylamine, and tributylamine.

6. A catalyst composition to catalyze the interfacial condensation reaction to produce polycarbonates, polyesters, copolymers, or mixtures thereof, said catalyst composition consisting essentially of a mixture of two or more catalysts wherein a first catalyst is selected from the group consisting of:

$(R)_4N^+X$, $R^1(R)_3Q^+X$, and $(R^2)_a(R^3)_{3-a}N-(CH_2)_nN-(R^3)_{3-a}(^2)_a(X)(X)$ where R is selected from the same or different $C_{(4-10)}$ alkyl group, $R^1$ is a $C(1-3)$alkyl group, $R^2$ is selected from the same or different $C_{(1-2)}$alkyl group, $R^3$ is selected from the same or different $C_{(3-10)}$ alkyl group, Q is a nitrogen or phosphorus atom, X is a halogen atom, or an $-OR^4$ group, $R^4$ is a member selected from H, $C_{(1-18)}$ alkyl or $C_{(6-18)}$ aryl, "n" is a whole number from 4 to 6 and "a" is a whole number equal to 0 or 1; and an effective amount of a second catalyst wherein said second catalyst is a tertiary organic amine having the formula:

$R^6_3N$ where each $R^6$ is independently selected from the group consisting of $C_2$ to $C_{10}$ alkyl radicals and wherein the weight ratio of the first catalyst to the second catalyst is from 4.9, to 1to 6.6 to 1.

7. A catalyst composition to catalyze the interfacial condensation reaction to produce polycarbonates, polyesters, copolymers, or mixtures thereof, said catalyst composition comprising a mixture of two or more catalysts wherein a first catalyst is selected from the group consisting of:

$(R)_4N^+X$, $R^1(R)_3Q^+X$, and $(R^2)_a(R^3)_{3-a}N-(CH_2)_nN-(R^3)_{3-a}(R^2)_a(X)(X)$ where R is selected from the same or different $C_{(4-10)}$ alkyl group, $R^1$ is a $C_{(1-3)}$alkyl group, $R^2$ is selected from the same or different $C_{(1-2)}$alkyl group, $R^3$ is selected from the same or different $C_{(3-10)}$ alkyl group, Q is a nitrogen or phosphorus atom, X is a halogen atom, or an $-OR^4$ group, $R^4$ is a member selected from H, $C_{(1-18)}$ alkyl or $C_{(6-18)}$ aryl, "n" is a whole number from 4 to 6 and "a" is a whole number equal to 0 or 1; and an effective amount of a second catalyst wherein said second catalyst is a tertiary organic amine having the formula:

$R^6_3N$ where each $R^6$ is independently selected from the group consisting of $C_2$ to $C_{10}$ alkyl radicals and wherein the weight ratio of the first catalyst to the second catalyst is from 4.9 to 1 to 6.6 to 1.

* * * * *